Patented Apr. 18, 1939

2,154,488

UNITED STATES PATENT OFFICE 2,154,488

PREPARATION OF ARACYL PERSULPHIDES

William Braker, Brooklyn, N. Y., assignor to E. R. Squibb & Sons, New York, N. Y., a corporation of New York No Drawing. Application May 28, 1937, Serial No. 145,297

10 Claims. (Cl. 260—608)

This invention relates to the preparation of aracyl persulphides, particularly benzoyl persulphide.

Benzoyl persulphide, a compound of the formula $C_6H_5COSSOCC_6H_5$ has hitherto been prepared almost exclusively by the oxidation of thiobenzoic acid and salts thereof. In another procedure (Engelhardt, Latschinow and Malyschew, Zeitschrift fur Chemie, 4, 358 and 455 (1868)) benzoyl chloride was reacted with lead disulphide in ether; but the yield was poor and the product contaminated with benzoyl sulphide.

It is the object of this invention to provide an improved method of preparing aracyl persulphides; specifically, a simple and efficient method of preparing benzoyl persulphide.

Essentially the method of this invention comprises reacting, in an aliphatic-alcohol medium, an aracyl halide with a metal disulphide soluble in said alcohol. Specifically, benzoyl persulphide may be prepared by reacting benzoyl chloride with sodium disulphide in an aqueous aliphatic-alcohol medium.

The alcohol employed is preferably ethyl alcohol but other aliphatic alcohols such as methyl alcohol and ethylene glycol can be used. In place of benzoyl chloride, the corresponding bromide or iodide can be used. The sodium disulphide can be replaced by potassium disulphide or any other metal disulphide at least moderately soluble in the aliphatic alcohol.

This invention is applicable to aracyl persulphides generally, inter alia naphthoyl persulphides and halogen, alkyl, and alkoxy, benzoyl persulphides.

The following example is illustrative of the invention:

Example 20.7 g. of anhydrous sodium sulphide is dissolved by heating in 150 cc. of 95% alcohol. 8.5 g. of sulphur is added, followed by 25 cc. of water. The resulting solution of sodium disulphide is cooled to 5–10° C. and 37 g. of benzoyl chloride added dropwise while stirring vigorously and maintaining the temperature at 5–10° C. A yellowish-white precipitate of benzoyl disulphide separates out, which is filtered off, washed with water, and dried in a vacuum over calcium chloride. On recrystallization from ethylene dichloride, a product melting at 128–129° C. is obtained, which is substantially pure benzoyl persulphide.

The invention may be variously otherwise embodied, within the scope of the appended claims.

I claim:

1. The method of preparing aracyl persulphides which comprises reacting, in a lower-aliphatic-alcohol medium, an aracyl halide with a metal disulphide soluble in said alcohol.

2. The method of preparing aracyl persulphides which comprises reacting an aracyl halide with an alkali metal disulphide in a lower-aliphatic-alcohol medium.

3. The method of preparing benzoyl persulphide which comprises reacting, in a lower-aliphatic-alcohol medium, a benzoyl halide with a metal disulphide soluble in said alcohol.

4. The method of preparing benzoyl persulphide which comprises reacting benzoyl halide with an alkali metal disulphide in a lower-aliphatic-alcohol medium.

5. The method of preparing benzoyl persulphide which comprises reacting, in an aqueous lower-aliphatic-alcohol medium, benzoyl chloride with a metal disulphide soluble in said alcohol.

6. The method of preparing benzoyl persulphide which comprises reacting benzoyl chloride with an alkali metal disulphide in an aqueous lower-aliphatic-alcohol medium.

7. The method of preparing benzoyl persulphide which comprises reacting benzoyl chloride with sodium disulphide in an aqueous lower-aliphatic-alcohol medium.

8. The method of preparing benzoyl persulphide which comprises reacting benzoyl chloride with potassium disulphide in an aqueous lower-aliphatic-alcohol medium.

9. The method of preparing benzoyl persulphide which comprises reacting benzoyl chloride with sodium disulphide in an aqueous ethyl alcohol medium.

10. The method of preparing benzoyl persulphide which comprises reacting benzoyl chloride with sodium disulphide in an aqueous methyl alcohol medium.

WILLIAM BRAKER.